UNITED STATES PATENT OFFICE.

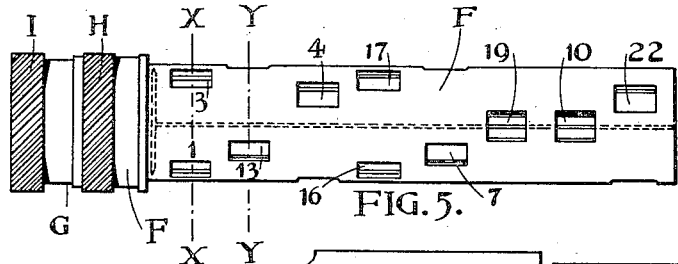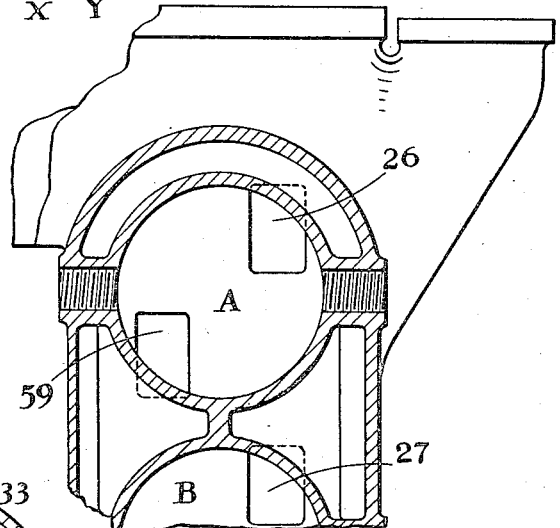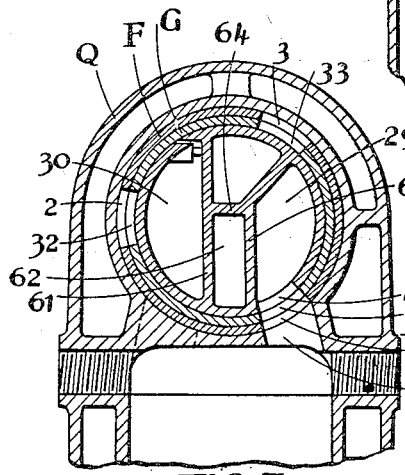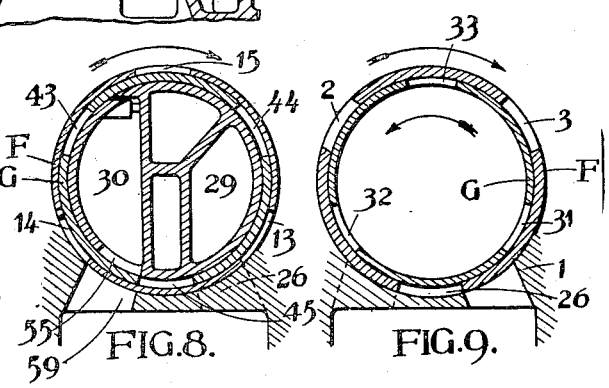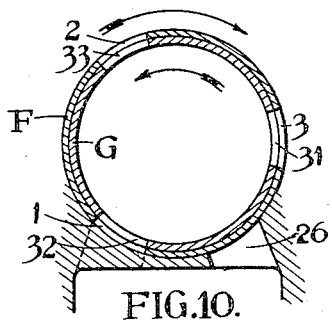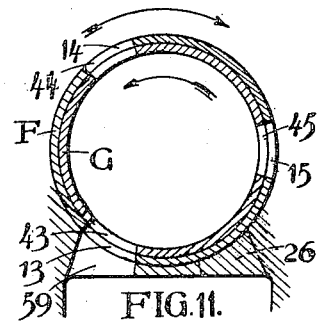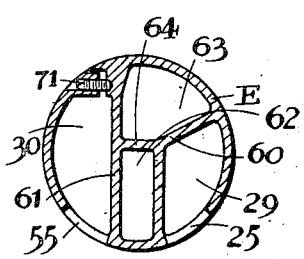

HENRY O. WILKINSON, OF PETTERIDGE, ENGLAND.

VALVE AND VALVE MECHANISM.

1,309,081.      Specification of Letters Patent.      Patented July 8, 1919.

Application filed October 11, 1916. Serial No. 124,993.

*To all whom it may concern:*

Be it known that I, HENRY ORWIN WILKINSON, a subject of the King of Great Britain, residing at Petteridge, England, have invented certain new and useful Improvements in Valves and Valve Mechanism, of which the following is a specification.

The invention relates to the valves of internal combustion engines and to means for operating same; and the objects of my improvement are, first, to construct a simple and efficient rotary valve gear; second, to provide means for the proper adjustment of the parts if worn; and third, to construct the parts in such a form that they may be efficiently cooled while giving a quick opening and closing of the ports to the cylinders.

Explosion engines have been previously proposed in which a casing is employed through which the inlet and exhaust of the gases from the cylinder take place, control of such operations being by means of a sleeve or by revolving the casing.

Hereinafter this casing, which includes the exhaust passage, will be referred to as the "manifold."

According to this invention a ported valve casing is employed having a stationary ported manifold within it and a sleeve, or sleeves, rotating between the faces of the valve casing and the manifold whereby a plurality of ports are opened in the same plane at each revolution, both for supply and exhaust; either a single sleeve rotates on the manifold, or a pair of sleeves one around the other, in which case they rotate concentrically in opposite directions.

The sleeves are continuously driven by suitable toothed gearing from the crank shaft of the engine, consequently, when once correctly set, such a valve gear will not get out of order and will run steadily without noise for long periods, while it can readily be removed for examination, or adjustment, if necessary.

Other advantages will be apparent from the following more detailed explanation of the structural features of the invention, and from the accompanying drawings, in which:—

Fig. 4 is a transverse section of the manifold, showing its several passages;

Fig. 5 is a side elevation showing the sleeves removed from their casing;

Fig. 6 shows the position of the ports in the cylinder head looking upward from below;

Figure 12:
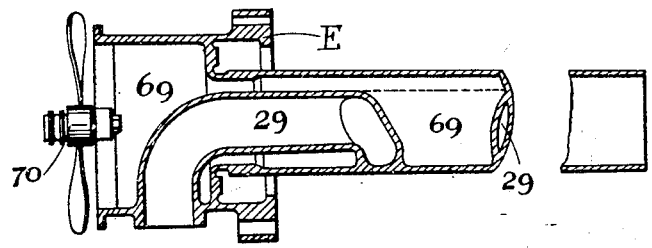

Figs. 7, 8, 9, 10 and 11 illustrate varying positions of the sleeves at different points of a four stroke cycle, Figs. 9, 10 and 11 having the manifold member omitted, Figs. 7, 9 and 10 being taken at a section, such as X X, (Fig. 5) through an inlet port, and Figs. 8 and 11 at a section such as Y Y through an exhaust port (see Fig. 5); and Fig. 12 is a section showing the adaptation of the manifold to air cooling.

Figure 2:
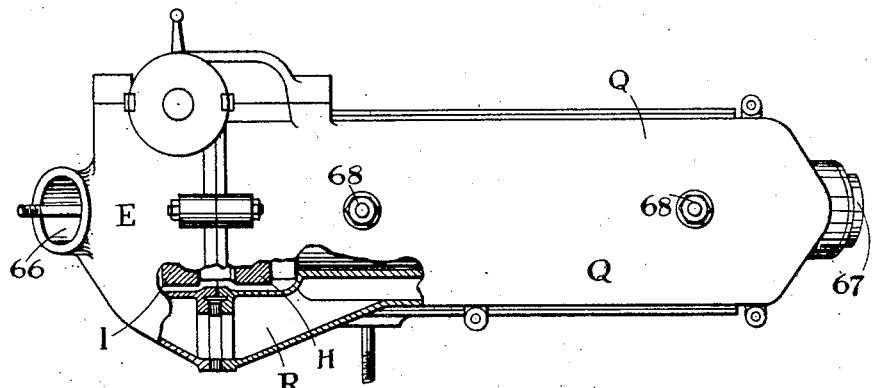
Fig. 2 is a plan of the top of the engine.
Figure 1:
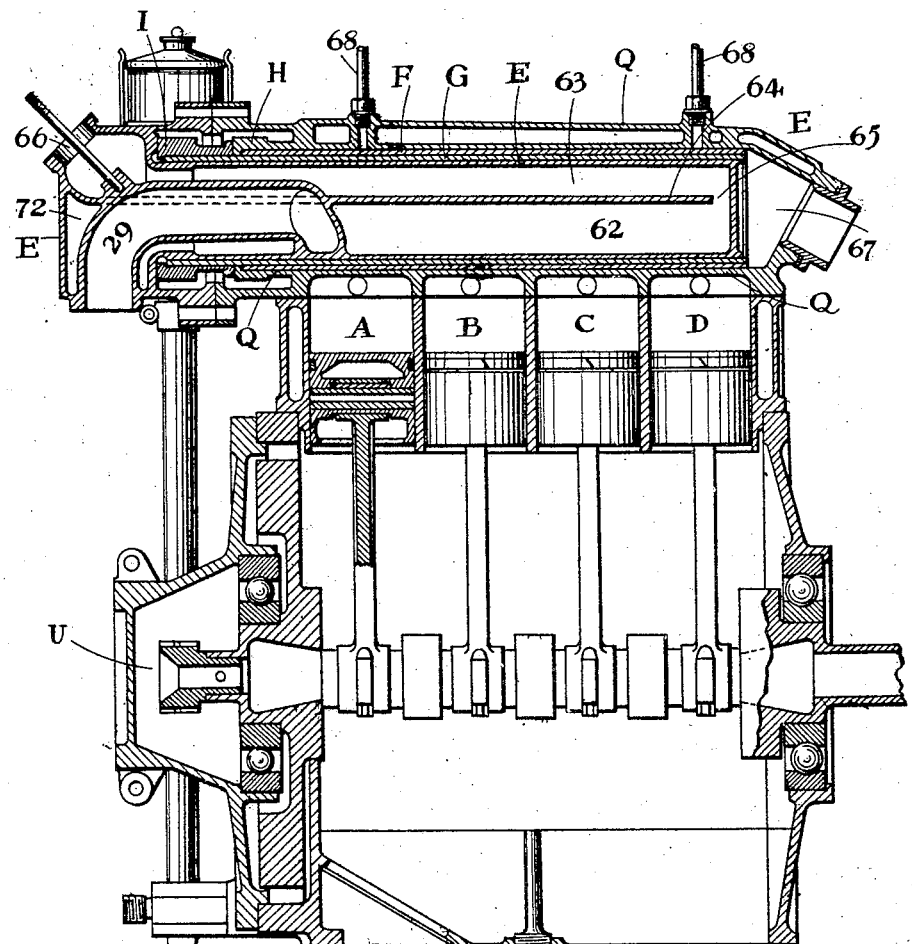
Figure 1 is a side elevation of an engine with four cylinders, partly in section.
Figure 3:
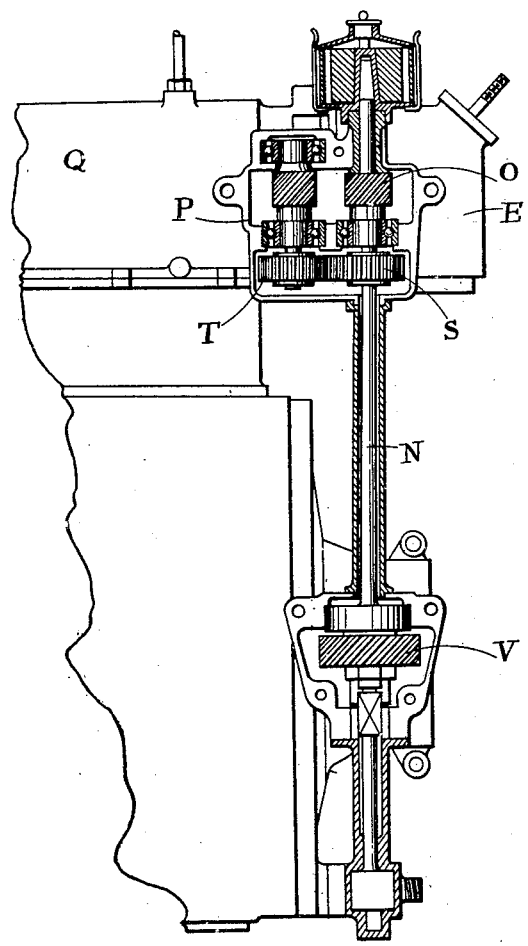
Fig. 3 is a partial view from one side of the engine showing method of driving.

Referring to Figs. 1, 2 and 3, A, B, C, D are the cylinders of a four cylinder engine having a valve chamber Q constructed across their ends, and having the stationary gas supply passage, or manifold E connected thereto so as to project within the chamber Q. Between the passage E and the chamber Q are the sleeves F, G, of which F is the shorter and rides on G, which rotates on the manifold E, (see also Fig. 5).

The helical wheel H is attached to F, and the wheel I to G, and admission ports 1, 2, 3, 4, ... 7, ... 10, ... and exhaust ports 13, 14, 15, 16, 17, ... 19, ... 22, ... are cut in the sleeve F, while admission ports 31, 32, 33 and the like, and exhaust ports 43, 44, 45 and the like, are cut in the sleeve G. Further, four admission ports such as 25 and four exhaust ports, such as 55, are cut out of the manifold E, four admission ports such as 26 corresponding to these latter, and four exhaust ports such as 59, being constructed from the valve chamber to the cylinder. By coincidence of these ports say 25, 31, 1, 26, as shown in Fig. 7, admission from the manifold passage 29 to the cylinder A is obtained.

The manifold E besides the admission section 29 is divided by the partition 60, 61, so as to form an exhaust section 30, and an intermediate section 62, 63, (see Fig. 4) divided by the rib 64, to form a water space, a port 65 (Fig. 1) being left in the rib 64 at one end for the water to pass from 62 to 63, whence it passes to the water outlet 66; the admission section 29 is open at the left end to the carbureter, and the exhaust section 30 is open at the right hand end to the exhaust outlet 67.

The ports 25, 55 shown in Fig. 4 are not really in the same sectional plane as shown, one being nearer the end than the other as indicated by the corresponding ports shown in Figs. 6, 7 and 8.

The valve chamber Q is shown with a water jacket, and by means of a connecting tube R water is passed to the space 72 of the manifold E, and thence to sections 62, 63 of same and out at 66 passing on the way through the port 65 (Fig. 1).

It should be noted that by constructing the manifold E with a through way cooling passage 69 as shown in Fig. 12, air cooling may readily be applied to the valve. A fan 70 advantageously is mounted at one end, as is a quite simple matter very commonly done for cooling a radiator, and thus blows a strong stream of air through the said passage 69. Alternatively, instead of the fan 70, an ejector can be so arranged in the exhaust outlet as to induce a current of air along the passage 69 left open to the air at the carbureter end, but opening into the exhaust space 67 at the other end, or both ends may be left open to the atmosphere.

Referring to Figs. 4 and 7, interior adjustment of the manifold E is effected by dividing one side of the exhaust section 30 longitudinally and pressing outward the flexible length thus formed by means of grub screws such as 71; this flexible length is also divided transversely at its inner end. The sleeve G located thereon is also divided almost wholly in a longitudinal direction as shown by the dotted lines in Fig. 5. Thus both may be expanded in order to take up any wear within the solid sleeve F.

Referring now to Figs. 5, 6, 7, 8, 9, 10, 11, it should first be noted that the exhaust ports occur around a different zone from the inlet ports. X X (Fig. 5) indicates the inlet port zone, and Y Y the exhaust port zone for the cylinder A, Fig. 6 showing the corresponding cylinder ports looking upward from below: Figs. 7, 9 and 10 therefore, are sections on the line X X, whereas Figs. 8 and 11 are sections on the line Y Y. Fig. 7 shows the inlet ports to the cylinder open for taking in gas on the induction stroke, viz., by the coincidence of ports 25, 31, 1, 26; Fig. 8 shows the position of the exhaust ports at the same moment, viz., with the manifold port 55 closed by sleeves F and G; Fig. 9 shows the position of the inlet ports during the compression stroke; Fig. 10 shows the inlet ports during the firing stroke; and Fig. 11 shows the cylinder open to the exhaust, viz., by coincidence of the ports 59, 13, 43, 55.

Fig. 3 shows the driving gear: N is a shaft carrying the helical pinion O which gears with the wheel I on the sleeve G, while the helical pinion P gears with the wheel H on the sleeve F: S, T are a pair of plain spur wheels interposed to reverse the rotation of the wheel H as compared with the wheel I, and U, V are a pair of wheels transmitting motion from the engine shaft.

It should be understood that though shown on the drawings with the valve sleeves arranged transversely and across the ends of the cylinders to which they give access, they may also be arranged to rotate vertically, in which case the valves may be in separate sections one section to each cylinder, or perhaps to a pair of tandem cylinders, or the valve may work longitudinally with cylinders distributed around it.

Both the sleeves and the manifold may be of any reasonable length and consequently only two sleeves need be used for any number of cylinders; also since the cylinders are invariably placed close to each other no appreciable loss of power results from friction when there are many cylinders, as only just sufficient length of sleeve is needed to cover the added cylinders.

The speed of rotation will depend on the number of ports around a given circumference, and may be quite slow say 1 to 6 of the crank shaft speed if there are three ports, or 1 to 8 if there are four ports in a circumference.

Both the admission and the exhaust port opening to the cylinder occur by reason of the coincidence of ports in the manifold, the inner sleeve and the outer sleeve respectively, and as the two latter move in opposite directions the opening and closing of the ports take place very quickly, which is a point of material importance.

It will be seen that a modified arrangement of the invention may be employed by using only one sleeve around the manifold; although not quite so efficient as the two sleeves, owing to the slower opening and closing of the ports, it would be quite effective in distributing fluid pressure to an engine, and by increasing the speed of the single sleeve somewhat a nearly equal result may be attained.

Having thus described my invention, what I claim as new and desire to secure by Letters Patent is:—

1. Valve mechanism for internal combustion engines comprising the combination of a stationary inlet and exhaust manifold having a cooling chamber divided for the greater part of its length by a rib for circulating purposes, an opening at one end of the manifold connected with the cooling chamber for the passage of a cooling medium to the chamber, a pair of concentric sleeves each having a plurality of inlet and exhaust ports for each corresponding port of each cylinder, and means for rotating the sleeves in opposite directions.

2. In valve mechanism for an internal combustion engine, the combination of a stationary multiple ported fluid pressure supply and exhaust manifold, with a pair of multiple ported sleeves revolving concentrically one upon the other around the said manifold, a side or sides to the said manifold divided by means of a fine space separating the material of such side almost wholly in a longitudinal direction and partially in a transverse direction, means for expanding the divided side or sides slightly by utilizing the flexibility of the material, and means for rotating the said sleeves in opposite directions, substantially as and for the purpose set forth.

3. In valve mechanism for an internal combustion engine, the combination of a valve casing, with a stationary fluid pressure supply and exhaust manifold within the casing having a separate inlet port and a separate exhaust port in register with corresponding ports through the said casing to each cylinder of the engine, a pair of multiple ported sleeves revolving in opposite directions around the said manifold having a plurality of inlet ports in their circumference applicable to each inlet port of the manifold, and a plurality of corresponding exhaust ports applicable to each exhaust port of the manifold, double walls forming a hollow partition which divides the manifold longitudinally into an inlet passage on one side of the partition common to all its inlet ports, and an exhaust passage on the other side of the partition common to all its exhaust ports, a cross rib in the hollow partition with a port at one extreme end, a tube connecting the passage on one side of the rib with the cooling space of the valve casing, whereby the cooling medium from the latter passes along the hollow partition through the said port and back again, and means for revolving the said sleeves in opposite directions.

4. In valve mechanism for an internal combustion engine, the combination of a valve casing, with a stationary fluid pressure supply and exhaust manifold within the casing, having a separate inlet port and a separate exhaust port in register with corresponding ports through the said casing to each cylinder of the engine, an inner ported sleeve of longer length than the outer sleeve, and provided with a toothed driving wheel on a projecting part, an outer sleeve provided with a toothed driving wheel, a pinion and counter shaft carrying a connecting wheel and a sleeve wheel pinion driving one sleeve from the engine shaft, and a second shaft carrying a connecting wheel and a sleeve wheel pinion meshing with the first connecting wheel and the other sleeve wheel respectively, substantially as and for the purpose set forth.

5. In valve mechanism for a combustion engine, the combination of a valve casing, with a stationary fluid pressure supply and exhaust manifold within the casing having a separate inlet port and a separate exhaust a separate inlet port in register with corresponding ports port in register with the valve casing to each cylinder of the engine, an inner ported sleeve around the said manifold, an outer ported sleeve around the inner sleeve, the said sleeves having inlet ports in their circumference applicable to each inlet port of the manifold, and corresponding exhaust ports applicable to each exhaust port of the manifold, toothed gearing connecting the crank shaft of the engine with the inner and outer sleeves, such gearing being arranged to rotate the sleeves in opposite directions at a speed which depends upon the number of ports in the circumference zone of the sleeves allotted to a single cylinder of the engine, a divided side of the manifold having means for expanding it slightly, a hollow ribbed partition longitudinally of the manifold between its inlet and exhaust passages respectively, and a tube connecting the said hollow partition with a cooling space about the valve casing whereby a continuous space for a cooling medium is formed around the casing jacket up the center of the manifold and back again to the outlet of the hollow partition; all substantially as and for the purpose set forth.

In testimony whereof I affix my signature.

HENRY O. WILKINSON.